(12) United States Patent
Craven

(10) Patent No.: US 7,328,584 B2
(45) Date of Patent: Feb. 12, 2008

(54) FRESH WATER EXTRACTION DEVICE

(75) Inventor: John P. Craven, Honolulu, HI (US)

(73) Assignee: Common Heritage Corporation, Honolulu, HI (US)

( * ) Notice: Subject to any disclaimer, the term of this patent is extended or adjusted under 35 U.S.C. 154(b) by 667 days.

(21) Appl. No.: 10/786,087

(22) Filed: Feb. 26, 2004

(65) Prior Publication Data

US 2005/0189209 A1   Sep. 1, 2005

(51) Int. Cl.
*F25D 17/06* (2006.01)

(52) U.S. Cl. .............................. 62/93; 62/150; 62/272

(58) Field of Classification Search ............... 62/92, 62/93, 121, 150, 260, 271, 272, 285, 288, 62/291; 55/315.1, 450; 203/10, 11
See application file for complete search history.

(56) References Cited

U.S. PATENT DOCUMENTS

| | | | | |
|---|---|---|---|---|
| 3,219,796 A | * | 11/1965 | Graf et al. | 392/327 |
| 3,616,270 A | * | 10/1971 | Ferrara | 203/47 |
| 3,675,442 A | * | 7/1972 | Swanson | 62/285 |
| 4,053,368 A | * | 10/1977 | Courvoisier et al. | 203/10 |
| 4,080,186 A | * | 3/1978 | Ockert | 55/438 |
| 4,146,372 A | * | 3/1979 | Groth et al. | 95/124 |
| 4,182,132 A | * | 1/1980 | Nasser et al. | 62/93 |
| 4,209,364 A | * | 6/1980 | Rothschild | 203/11 |
| 4,315,599 A | * | 2/1982 | Biancardi | 239/10 |
| 4,433,552 A | * | 2/1984 | Smith | 62/93 |
| 5,064,505 A | * | 11/1991 | Borgren | 202/202 |
| 5,744,008 A | | 4/1998 | Craven | |
| 6,709,198 B2 | * | 3/2004 | Wachtel | 405/36 |
| 6,868,690 B2 | * | 3/2005 | Faqih | 62/291 |

FOREIGN PATENT DOCUMENTS

JP    4-35800 A  *  2/1992

* cited by examiner

*Primary Examiner*—Mohammad M. Ali
(74) *Attorney, Agent, or Firm*—Kramer & Amado, P.C.

(57) ABSTRACT

A method and apparatus for collecting fresh water through atmospheric water collection and salt water desalination. The apparatus is used for a method of utilizing deep ocean water to extract fresh water from atmospheric water vapor while producing a byproduct of deep ocean water salt. The apparatus and method may include multiple vertical stages that utilize siphons and heat exchangers to move vapor condensing means through a plurality of stages to produce fresh water at every stage.

26 Claims, 3 Drawing Sheets

FRESH WATER EXTRACTION DEVICE

BACKGROUND OF THE INVENTION

Field of the Invention

This invention relates generally to the production of fresh water and, more particularly, to a system and process that both extracts water from the atmosphere and produces desalinated fresh water from deep ocean water.

A vast proportion of the world's coastline consists of arid regions that have desert like characteristics. In fact, many of these arid regions are classified as coastal lowland deserts that support only sparse and widely spaced vegetation, or no vegetation at all, due to the small amounts of rainfall that occur in these regions each year. Atmospheric moisture generated by the ocean is carried inland across these coastal lowlands seldom producing rain until it encounters a mountain range. Due to the fact that the land disposed inland of these arid coastal regions receives most of the precipitation, life for people living in these types of regions is difficult and often results in the perpetual search for water resources to sustain crops, livestock, and life itself.

SUMMARY OF THE INVENTION

The present invention seeks to overcome the problems encountered in these arid regions by the provision of a simple and efficient atmospheric water collection and salt water desalination process and device that extracts fresh water from the water vapor present in the atmosphere while producing a byproduct of deep ocean water salt. An example of an optimum environment in which to use the atmospheric water collection system of the present invention is a coastal arid region, although the present invention may be used in any region containing atmospheric water vapor. The device and process utilizes a dehumidifying device that is designed to use deep ocean water (hereinafter referred to as DOW) to extract water from the atmosphere and solar heat to extract salt from the DOW. The present invention also includes a water desalination device that obtains fresh water from DOW which has passed through a heat exchanger to an evaporation tower, which produces distilled water and extracts water from the atmosphere through the use of additional DOW which has been siphoned to the top of the tower. In this stage of the process, the water is stored at the top of the tower in a separate tank. The atmospheric collection device may be constructed in a stacked configuration to form a plurality of vertical stages that utilize heat exchangers and siphons to move the vapor condensing means through the plurality of stages to produce fresh water at every stage. These vertical stages may be stacked to higher elevations until the atmospheric pressure becomes too low and/or the temperature of the collected water is greater than a dew point of the specific surrounding region.

In this manner, deep ocean water, that has been pumped from a deep ocean pipe to an elevation on the coastal arid region slightly above the water level at high tide, is introduced into a siphon of coiled or layered irrigation pipe whose length and height above sea level is dependent upon the atmospheric pressure of the region. The temperature of the DOW should be below 10° Centigrade and preferably between 4° and 6° Centigrade. The irrigation pipe is fashioned from a heat exchanging material that has a sufficient thermal coefficient to condense fluidic vapors that may exist in the atmosphere. Condensate will form on the heat exchanger due to the levels of humidity in the air, and the atmospheric pressure and the dew point of the surrounding region and drip into a collection tank. The rate of fresh water collection from the heat exchanger is increased through the utilization of at least one vibrator that is configured to vibrate the heat exchanger to increase the rate of dripping.

The now partially heated DOW leaves the siphon of stage one at a slightly lower elevation corresponding to the head loss in the siphon and travels by gravity to stage two of the device. A portion of the DOW exiting stage one enters a plenum chamber housed within a tower that utilizes an evaporation chamber to provide the solar heat required to vaporize the DOW. The plenum is located at the base of the tower that is configured as a chimney and includes a vortex generator, as described in U.S. Pat. No. 5,744,008 and hereby incorporated herein by reference, that operates to maximize the flow of the vapor in an upward direction towards a collection structure disposed above the tower. The collection structure is configured in the form of a top hat that has a plurality of venting channels and apertures located therein and a collection tank disposed below the venting apertures. The DOW vapor is motivated by the vortex generator to form a vapor column that is moved upwards towards the collection structure. The venting apertures are oriented perpendicular to the direction of the wind to enhance the DOW vapor with atmospheric moisture. A part of the siphon is located in the collection structure in the path of the vapor to be condensed. The condensate is collected in the collection tank. The fresh water that is collected has been cooled by the DOW passing through the siphon pipes and is available for use through a gravity feed into another distribution system. A vibrator, as utilized in stage one, may be used here to increase the level of condensate collection.

Additional stages of condensate collectors could be stacked one upon the other and utilize additional siphons that incorporate heat exchangers to feed the cooled freshwater by gravity to successively higher elevations to condense the atmospheric water vapor present in the surrounding region. The stages are formed towers that may be approximately 30 feet tall, although towers of different heights will work just as well depending upon the atmospheric conditions at the tower level. These towers could be stacked up to elevations as high as cloud level at the top of the coastal inversion layer associated with the coastal arid regions.

Some simplifications and omissions may exist in the following summary, which is intended to highlight and introduce some aspects of the present invention, but not to limit its scope. Detailed descriptions of a preferred exemplary embodiment adequate to allow those of ordinary skill in the art to make and use the invention will follow in later sections.

BRIEF DESCRIPTION OF THE DRAWINGS

In order to better understand the present invention, reference is made to the accompanying drawings, wherein.

DETAILED DESCRIPTION OF THE PREFERRED EMBODIMENTS OF THE INVENTION

Figure 1:
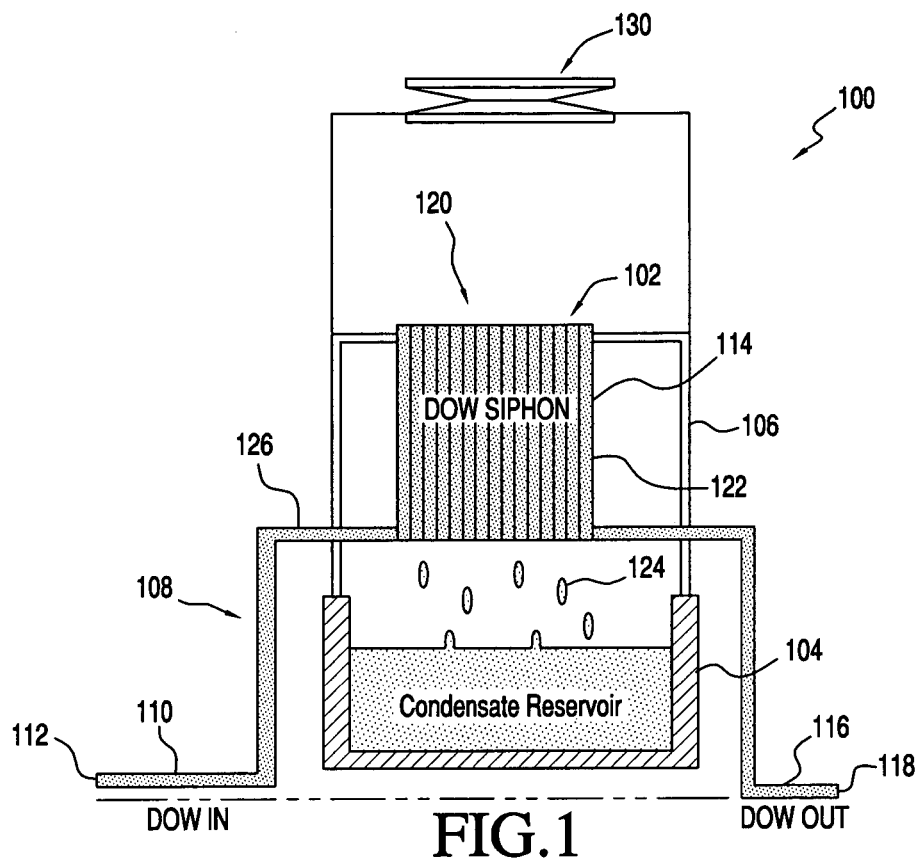
FIG. 1 illustrates a schematic view of the first stage of the atmospheric water collection apparatus of the present invention.

Referring now to the drawings, in which like numerals refer to like components or steps, there are disclosed broad aspects of the preferred embodiments of the present invention. The atmospheric water collection system of the present invention is designed to create fresh water from water vapor existing in the atmosphere at elevations above sea level through the utilization of cold deep ocean water and a siphoning system. The cold deep ocean water is obtained through the usage of a deep ocean water piping system and related pumping system that is well known to those having skill in the art. Therefore, the deep ocean water piping system and the related pumping system will not be discussed in detail herein. The deep ocean water piping and pumping system is configured to provide deep ocean water from a characteristic depth, depending upon the region wherein the atmospheric water collection system is utilized, such that the deep ocean water has a temperature of below 10° Centigrade, and preferably between 4° and 6° Centigrade. The characteristic depth of cold deep ocean water is usually defined as being below a depth of 2,000 ft.

Referring to FIG. 1, the atmospheric water collection system of the present invention includes a first stage 100 having a siphon 102, a collection tank 104, and a supporting structure 106. The siphon 102 includes an irrigation piping system 108 utilized for transporting the cold deep ocean water (DOW) through the first stage of the device. Irrigation pipe system 108 has a first end 110 that is connected to the source of cold DOW via an inlet 112 and the deep ocean water piping and pumping system (not shown), and a second end 116 defining an outlet 118 connected to an inlet of a second stage 300 of the atmospheric water collection system of the present invention, which is discussed in detail below with reference to FIG. 3. The irrigation piping system 108 utilizes pipes that are made of materials that have adequate insulating properties to keep undue amounts of heat from the cold DOW from passing therethrough. Disposed between first end 110 and second end 116 of irrigation piping system 108 is a part of siphon 102 that includes a layered irrigation pipe 120 connected to first end 110 and second end 116 thereof. Siphon 102 is used to elevate the cold DOW and utilize the cold temperature of the DOW passing through irrigation piping system 108 to produce condensate from the atmospheric water vapor existing in the environment. Cold DOW may be introduced into siphon 102 at an elevation as high as 30 feet or more, depending upon the atmospheric pressure at the specific elevation of siphon 102. Layered irrigation pipe 120 is constructed from materials that have a sufficient thermal coefficient to behave as a heat exchanger 114 configured to transport the cold temperature of the DOW passing through the inside of layered irrigation pipe 120 to an outside surface 122 thereof. As illustrated in FIG. 1, heat exchanger 114 is configured to condense water vapor existing in the humid atmosphere on outer surface 122 thereof and allow the condensate 124 to drip from outer surface 122 into collection tank 104 at a rate of collection. Collection tank 104 may comprise one or more strategically placed tanks although only one tank is shown.

The elevation of layered irrigation pipe 120 is elevated above collection tank 104 via supporting structure 106. Supporting structure 106 may take the form of any suitable supporting structure configured to elevate siphon 102 to a suitable elevation to effect its intended purpose. The first stage 100 of the atmospheric water collection system may also be enclosed in a suitable chamber (not shown) that protects the collected condensate from evaporation while allowing atmospheric water vapor to interact with layered irrigation pipe 120 and heat exchanger 114.

Those having skill in the art will appreciate the fact that the condensate collection rate is dependent upon the amount of time required to produce condensate 124 on heat exchanger 114 that has acquired a sufficient weight such that the force of gravity breaks the bonds present between outer surface 122 and condensate 124 when condensate 124 is formed on heat exchanger 114.

In order to increase the rate of condensate collection, a vibrator 130 is utilized to interact with layered irrigation pipe 120 and heat exchanger 114. Vibrator 130 employs vortex induced vibrations of the prevailing wind to act upon layered irrigation pipe 120 and heat exchanger 114. These vibrations engage irrigation pipe 120 by effectively vibrating the same and breaking the bonds formed between condensate 124 and outer surface 122 of irrigation pipe 120. Once these bonds break, gravity separates the loosened condensate 124 from outer surface 122. The condensate falls into collection tank 104 allowing atmospheric vapor to engage heat exchanger 114 at a location that lacks condensate due to the recent separation. This effect further increases the rate of condensate collection. In another embodiment of the present invention, the heat exchanger is coated with a surfactant/surface agent that decreases the bonding of hydrogen molecules with the outer surface of the heat exchanger to effect easy run-off of condensate.

Figure 2:
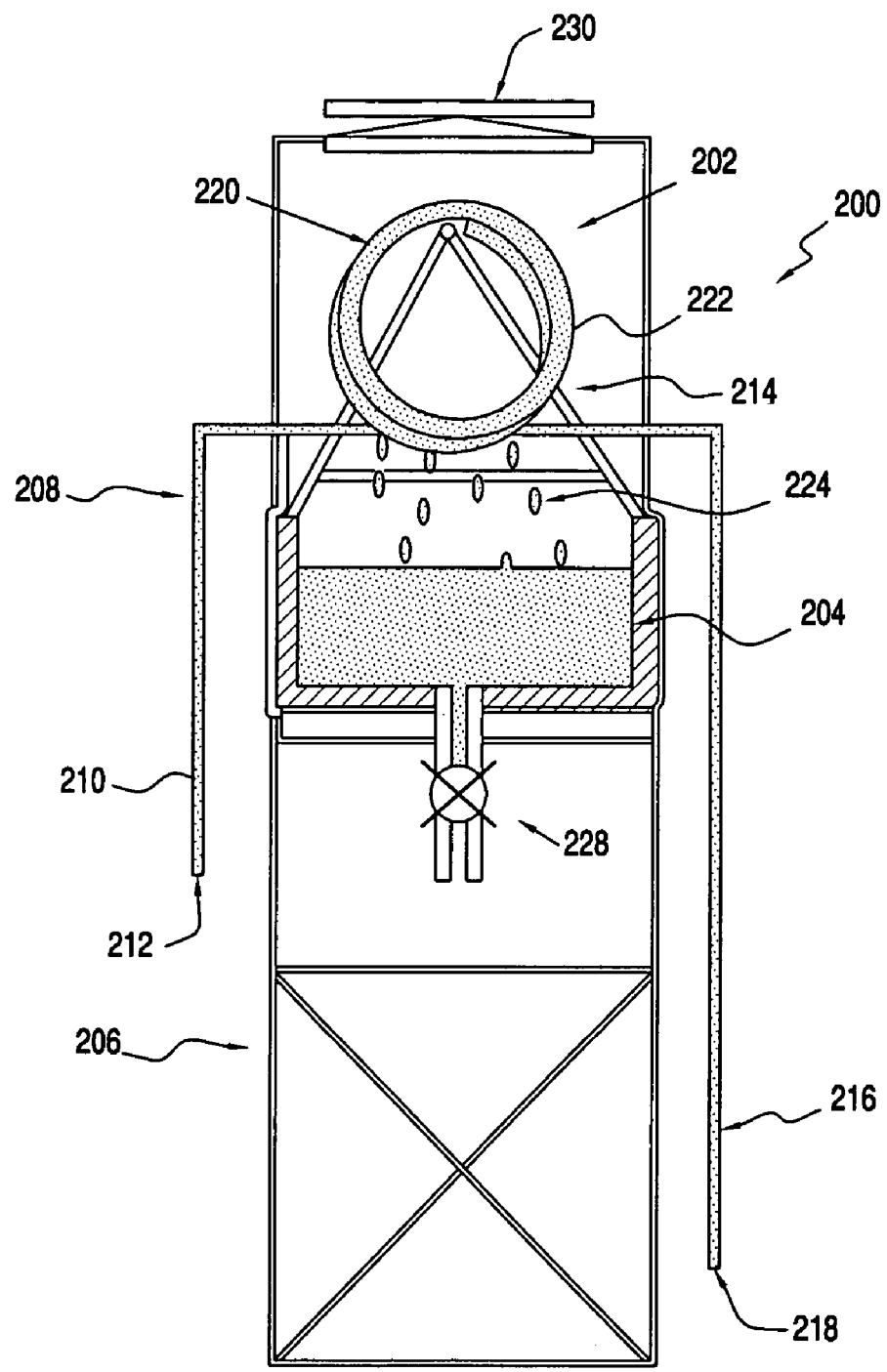
FIG. 2 illustrates a schematic view of the first stage of another embodiment of the atmospheric water collection apparatus of the present invention.

FIG. 2 shows another embodiment 200 of a first stage of the atmospheric water collection systems that utilizes all of the elements described in reference to FIG. 1. Referring to FIG. 2, the atmospheric water collection system of the present invention includes a first stage 200 having a siphon 202, a collection tank 204, and a supporting structure 206. The siphon 202 includes an irrigation piping system 208 utilized for transporting the cold deep ocean water (DOW) through the first stage of the device. Irrigation pipe system 208 has a first end 210, that is connected to the source of cold DOW, via an inlet 212 and the deep ocean water piping and pumping system (not shown), and a second end 216 defining an outlet 218 connected to an inlet of a second stage 300 of the atmospheric water collection system of the present invention, which is discussed in detail below with reference to FIG. 3.

The irrigation piping system 208 utilizes pipes that are made of materials that have adequate insulating properties to keep undue amounts of heat from the cold DOW from passing therethrough. Disposed between first end 210 and second end 216 of irrigation piping system 208 is a part of siphon 202 that includes a coiled irrigation pipe 220 connected to first end 210 and second end 216 thereof. Siphon 202 is used to elevate the cold DOW and utilize the cold temperature of the DOW passing through irrigation piping system 208 to produce condensate from the atmospheric water vapor existing in the environment. Cold DOW may be introduced into siphon 202 at an elevation as high as 30 feet or more, depending upon the atmospheric pressure at the specific elevation of siphon 202. Coiled irrigation pipe 220 is constructed from materials that have a sufficient thermal coefficient to behave as a heat exchanger 214 configured to transport the cold temperature of the DOW passing through the inside of layered irrigation pipe 220 to an outside surface 222 thereof. As illustrated in FIG. 2, heat exchanger 214 is configured to condense water vapor existing in the humid atmosphere on outer surface 222 thereof and allow the condensate 224 to drip from outer surface 222 into collection tank 204 at a rate of collection. Collection tank 204 may comprise one or more strategically placed tanks although only one tank is shown.

The elevation of coiled irrigation pipe 220 is elevated above collection tank 204 via supporting structure 206. Supporting structure 206 may take the form of any suitable supporting structure configured to elevate siphon 202 to a suitable elevation to affect its intended purpose. The first stage 200 of the atmospheric water collection system may also be enclosed in a suitable chamber (not shown) that protects the collected condensate from evaporation while allowing atmospheric water vapor to interact with coiled irrigation pipe 220 and heat exchanger 214. In another embodiment, collection tank 204 may include a valve and water distribution system 228, which uses gravity to distribute freshwater to predetermined locations (not shown).

Those having skill in the art will appreciate the fact that the condensate collection rate is dependent upon the amount of time required to produce condensate 224 on heat exchanger 214 that has acquired a sufficient weight such that the force of gravity breaks the bonds present between outer surface 222 and condensate 224 when condensate 224 is formed on heat exchanger 214.

In order to increase the rate of condensate collection, a vibrator 230 is utilized to interact with coiled irrigation pipe 220 and heat exchanger 214. Vibrator 230 employs vortex induced vibrations of the prevailing wind to act upon coiled irrigation pipe 220 and heat exchanger 214. These vibrations engage irrigation pipe 220 by effectively vibrating the same and breaking the bonds formed between condensate 224 and outer surface 222 of irrigation pipe 220. Once these bonds break, gravity separates the loosened condensate 224 from outer surface 222. The condensate falls into collection tank 204 allowing atmospheric vapor to engage heat exchanger 214 at a location that lacks condensate due to the recent separation. This effect further increases the rate of condensate collection. In another embodiment of the present invention, the heat exchanger is coated with a surfactant/surface agent that decreases the bonding of hydrogen molecules with the outer surface of the heat exchanger to effect easy run-off of condensate.

A second stage 300 of the atmospheric water collection system will be described with reference to FIG. 3. Second stage 300 is configured to obtain the now partially warmed DOW from first stage 200 to produce another supply of fresh water that is separate from the supply of condensate produced from first stage 200. Second stage 300 includes a vortex generator 302, condensate collecting structure 303 and a DOW piping system 310. A warm salt water storage tank 308 is illustrated to store the partially warmed DOW although tank 308 is not required in the present invention. Salt water storage tank 308 obtains the partially warmed DOW from first stage 200 via inlet pipe 312.

Vortex generator 302 is fully described with reference to U.S. Pat. No. 5,744,008, incorporated herein by reference, and thus will not be described in detail. Vortex generator 302 includes a tower 314 having a base 320 and a top 322, a plenum chamber 316 disposed at the base 320, a rotor 318 disposed in the center of tower 314. Rotor 318 is driven by a motor in a smooth rotating fashion and configured to produce a circulation of air that approximates a core of a hurricane. Plenum chamber 316 is connected to salt water storage tank 308 via salt water pipe 324. An evaporation chamber 326 is defined within tower 314 and is configured to allow the sun's energy to heat the warm salt water 328 held within plenum chamber 316 to produce water vapor 330. The top 322 of tower 314 is covered by a semi-hemispherical structure 334 made of a material that is transparent to solar rays and configured in a manner such that the solar energy may reach the warm salt water 328 to effectively heat and transform the same into water vapor.

Rotor 318 rotates with a surface velocity in the range of 75 to 100 mph and produces circulations of air that rotate around tower 314 heuristically of the order of magnitude of the velocities in a hurricane. Tower 314 has a cylindrical shape and is configured to cooperate with rotor 318 to induce a chimney effect with respect to the water vapor 330 produced in evaporation chamber 326. Thus, as the salt water 328 is heated, water vapor 330 is forced to form a vapor column 336 that moves in an upwards direction due to the rotational forces produced by the rotation of rotor 318 within tower 314. Tower 314 includes a transfer channel 338 defined within semi-hemispherical structure 334 configured to allow the vapor column 336 to transfer from the tower 314 to collecting structure 303. The vapor is transferred through the channel at an elevated point defined near the top of tower 314 due to the chimney effect created by vortex generator 302 and the tower configuration. The waste salt water 328 may be removed via outlet pipe 372 and stored for later use or transported to a suitable location.

Collecting structure 303 is formed of two similar chambers 304 and 306, located on alternative sides of tower 314. Collecting chambers 304 and 306 are similar in construction to one another and include a first set of siphons 352, a second set of siphons 356, a plurality of vapor vents 340, defined within collecting chambers 304 and 306, and collection tanks 342 and 344 disposed within the bottoms thereof. Collecting chambers 304 and 306 are disposed around the top of tower 314 and configured in a manner such that transfer channel 338 allows the water vapor 330 within vapor column 336 to enter the interior of collection chambers 304 and 306. Vapor vents 340 are also positioned in a manner such that the water vapor contained in the surrounding atmosphere and the prevailing winds enters collecting structures 304 and 306 at an efficient rate. To this end, vapor vents 340 may be positioned perpendicularly to the prevailing wind, although other positions may be suitable depending upon the atmospheric characteristics of the region.

DOW piping system 310 includes a first end 346 having an inlet 348 for transporting cold DOW from the deep ocean water pipes to siphons 352 and siphons 356. Siphons 352 and 356 are positioned within collecting chambers 304 and 306 to transport the cold DOW, via inlet pipes 346, 360, 362, 364 and 368 to interact with the atmospheric vapor and the water vapor 330 disposed within collecting chambers 304 and 306. Siphons 352 and 356 are similar in construction to siphon 102 or 202, include heat exchangers 350 similar to heat exchanger 114 or 214, and may include a layered or coiled irrigation pipe, as described with reference to FIGS. 1 and 2 above. Heat exchangers 350 are positioned to interact with the water vapor 330 and atmospheric vapor disposed in collecting chambers 304 and 306. In this manner, the temperature of the cold DOW may be transported to an outer surface of heat exchangers 350 to produce a supply of condensate 354 and collect condensate 354 within collection tanks 342 and 344.

Siphons 356, that are disposed within collecting chambers 304 and 306, respectively, include heat exchangers 358 and are similar in construction to heat exchangers 350. Siphons 356 are positioned within collecting tanks 342 and 344 and are utilized to transport the cold DOW and, more specifically, the temperature of the cold DOW to the outer surface of heat exchangers 358 to condense the atmospheric water vapor present within collecting chambers 304 and 306 and to keep the condensate 354 cold for reasons that will become apparent hereinafter. Inlet pipe 402 and outlet pipe 404 include an inlet 422 and an outlet 424 that are disposed within condensate 354 to transport cold condensate 354 to a third stage 400 of the atmospheric water collection system of the present invention, described in greater detail below.

In an alternative embodiment of the present invention, siphons 356 may be a part of siphons 352, and thus, directly connected to siphons 352 to form one set of siphons. In another alternative embodiment of the present invention, vibrators (not shown) similar to those utilized in the first stages 100 and 200, may be utilized to increase the rate of collection from siphons 352 and 356.

Figure 4:
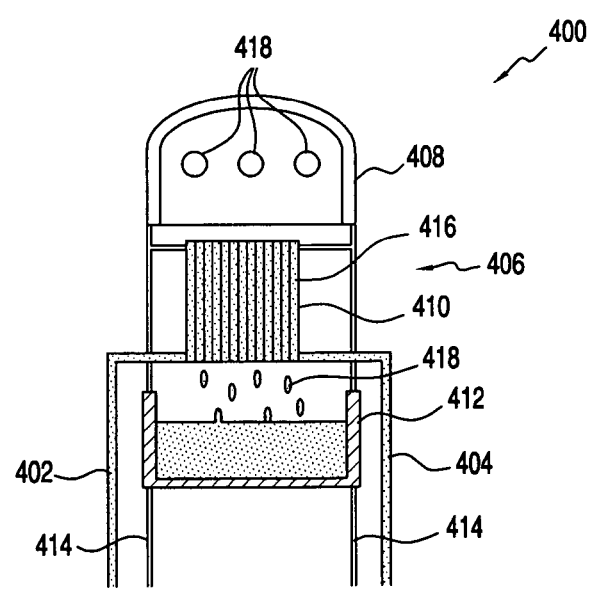
FIG. 4 illustrates a schematic view of the third stage of the atmospheric water collection apparatus of the present invention.
Figure 3:
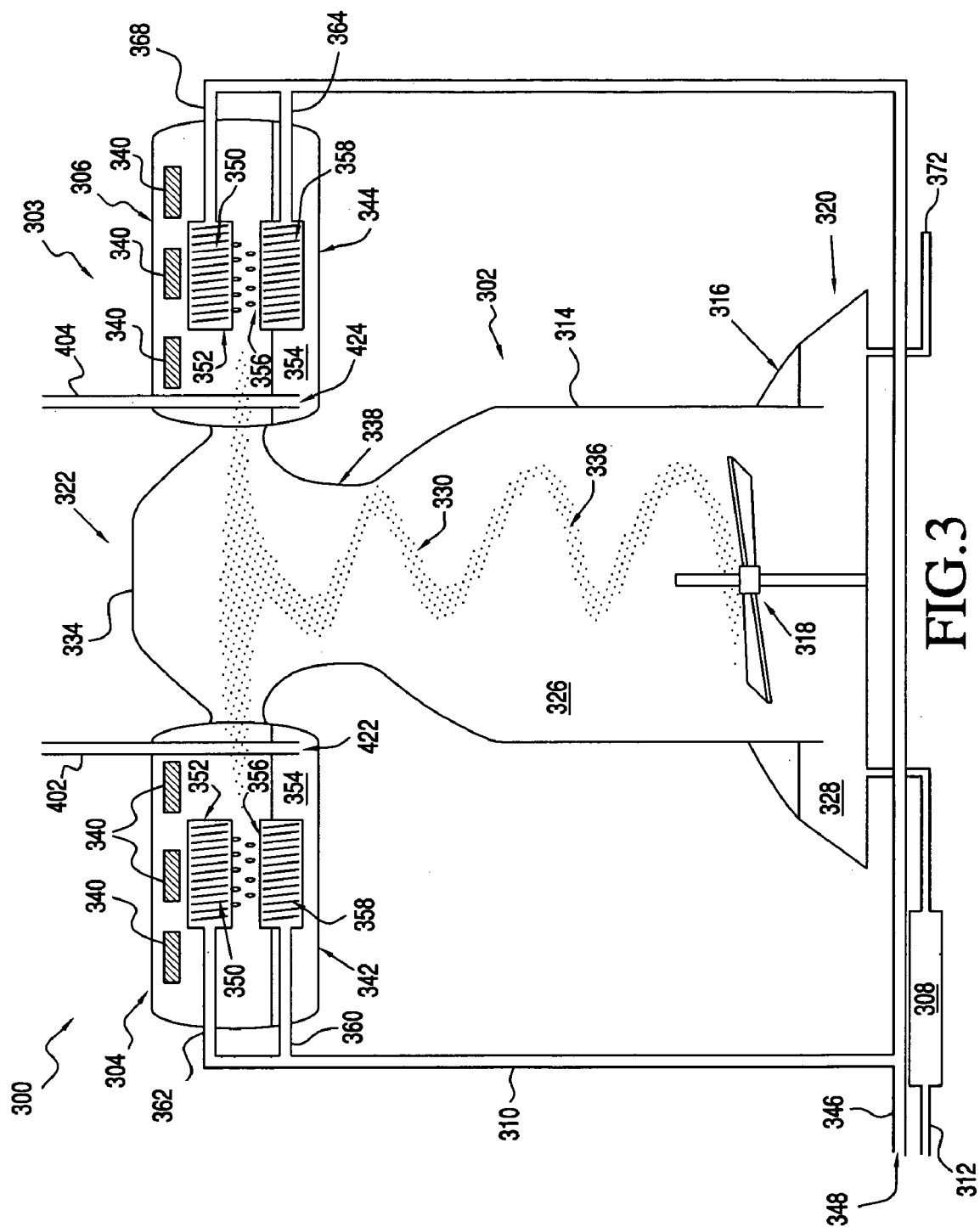
FIG. 3 illustrates a schematic view of the second stage of the atmospheric water collection apparatus of the present invention.

With reference to FIGS. 3 and 4, the third stage 400 of the atmospheric water collection system of the present invention will be described. The third stage 400 includes a stacking tower 406 including an atmospheric cap 408, a siphon 410, a collection tank 412, and a supporting structure 414. Siphon 410 is positioned within stacking tower 406 to transport the cold condensate 354 collected in collection tank 342, via inlet pipe 402 to interact with the atmospheric vapor in the surrounding region at a higher elevation than the collecting chambers 304 and 306 are disposed. Siphon 410 is similar in construction to siphon 102 or 202, includes a heat exchanger 416 similar to heat exchanger 114 or 116, and may include a layered or coiled irrigation pipe, as described with reference to FIG. 1 or FIG. 2. Heat exchanger 416 is positioned to interact with and condense the atmospheric water vapor existing in the surrounding region. In this manner, the temperature of the cold condensate 354 may be transported to an outer surface of heat exchanger 416 to produce a supply of condensate 418 and collect condensate 418 within collection tank 412. The supply of cold condensate siphoned from collecting tank 342 is returned to collecting tank 344 via outlet pipe 404.

Atmospheric cap 408 includes a plurality of vapor vents 418 formed therein and configured to allow atmospheric vapor to enter the stacking tower to interact with heat exchanger 416. Supporting structure 414 connects stacking tower 406 to collecting structure 303 via a suitable means that is well known by those having ordinary skill in the art. As described with reference to first and second stages 100, 200 and 300, respectively, of the present invention, at least one vibrator (not shown) similar to that utilized in the first stage 100 or 200, may be utilized to increase the rate of condensate collection.

Referring to FIGS. 1-4, the process of producing fresh water from atmospheric water vapor and commercial quality DOW salt, utilizing the atmospheric water collection system of the present invention, will now be described. In operation, the DOW having a temperature of approximately below 10° Centigrade and preferably between 4° and 6° Centigrade is pumped from depths of about 2,000 feet below sea level through deep ocean pipes to an elevation slightly above the highwater table. At this point, the DOW is siphoned utilizing siphon 102 through piping system 108 and heat exchanger 122 to an elevation at or below 30 feet above the coastal surface, depending upon the atmospheric pressure and dew point. Due to the cold temperature of the DOW, condensate 124 will form on the layered irrigation pipe 120 and drip into the collection tank 104. At least one vibrator 130 may be operated to induce vibrations within the layered irrigation pipe 120 to increase the rate of dripping and thus the rate of condensate collection. The partially heated DOW leaves siphon 102 at a slightly lower elevation corresponding to the head loss in siphon 102 and travels by gravity out of second end 116 and outlet 118 of piping system 108 to second stage 300 of the atmospheric water collection system.

The partially heated DOW enters tower 314 and plenum chamber 316, disposed within evaporation chamber 326, and is heated by the solar rays to produce water vapor within tower 314. Rotor 318 begins to rotate in the range of approximately 75 to 150 mph to produce at least one vortex of circulating air within tower 314. As the heated air circulates, the chimney effect is induced as water vapor 330, produced on the surface of warm salt water 328 disposed in plenum chamber 316, rises and swirls in an upwardly direction to form vapor column 336. At this point, siphons 352 and 356 have transported the cold DOW through DOW piping system 310 such that heat exchangers 350 and 358 have acquired temperatures on an outer surface thereof that are sufficient to condense water vapor. Water vapor 330 exits tower 314, via exit 338 formed within semi-hemispherical structure 334, and travels along with atmospheric vapor through vapor vents 340. The mixed vapor engages heat exchangers 350 and 358, disposed within collecting structures 304 and 306, to produce condensate 354 that drips into collection chambers 342 and 344. As condensate 354 is collected within collection tanks 342 and 344, heat exchangers 350 and 358 cool condensate 354 to a sufficient temperature to be utilized in third stage 400 of the present invention. As the DOW is evaporated from plenum chamber 316, DOW salt is created as a byproduct of the process, which may be collected and utilized in various commercial activities.

Condensate 354, which has been cooled by the cold DOW, is transported to stacking tower 406, disposed at a higher elevation, to third stage 400 via siphon 410. The atmospheric moisture, present at that elevation, enters vapor vents 418 formed within atmospheric cap 408 and engages heat exchanger 416 to produce condensate 420 on an outer surface thereof. As condensate 420 drips from heat exchanger 416, it is collected within collection tank 412. At this point in the atmospheric water collection process, another stacking may be added that siphons the cold condensate 420 from collection tank 412 to condense atmospheric vapor at higher elevations. As discussed with reference to first stage 100 or 200, at least one vibrator may be operated in second stage 300 and third stage 400 to induce vibrations within the respective heat exchangers to increase the rate of condensate collection. The present invention allows for the addition of stacking towers to an elevation up to the cloud level as long as the atmospheric conditions are conducive to produce condensate from atmospheric vapor.

Although the present invention has been described in detail with particular reference to preferred embodiments thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method of collecting fresh water, comprising:
    pumping sea water having a temperature of approximately 10° Centigrade or lower through at least one heat exchanging conduit;

said heat exchanging conduit comprising an outer surface;

allowing the outer surface of the heat exchanging conduit to interact with the atmosphere until water condenses on the outer surface; and collecting the condensate that accumulates on the outer surface;

wherein the collection of water is facilitated through vibration of the heat exchanging conduit.

2. The method of claim 1, wherein the pumping is carried out using a siphon.

3. The method of claim 1, wherein the sea water is deep ocean water naturally having a temperature of approximately 10° Centigrade or lower.

4. The method of claim 1, wherein the seawater has a temperature of under 6° Centigrade.

5. The method of claim 1, wherein vibration of the heat exchanging conduit is through a wind induced vibrator.

6. The method of claim 1, wherein the atmosphere is an arid coastal region.

7. The method of claim 1, wherein the outer surface of the heat exchanging conduit includes a coating of a material that prevents hydrogen bonding, thereby facilitating dripping of the condensate.

8. The method of claim 1, further comprising the steps of:

transporting the now warmer sea water leaving a first heat exchanging conduit to a chamber;

allowing solar heating to vaporize the warmer sea water to create a vapor column;

allowing the outer surface of a second heat exchanging conduit to interact with the vapor column; and collecting the condensate that accumulates on the outer surface of the second heat exchanging conduit.

9. The method of claim 8, wherein the sea water is deep ocean water naturally having a temperature of approximately 10° Centigrade or lower.

10. The method of claim 8, wherein the seawater has a temperature of under 6° Centigrade.

11. The method of claim 8, wherein the collection of water is facilitated through vibration of the second heat exchanging conduit.

12. The method of claim 8, further comprising the step of creating a vortex in connection with the vapor column to induce a chimney effect.

13. An apparatus for collecting freshwater comprising a first stage comprising:

a siphon, further comprising a piping system, said piping system having a length great enough to reach deep ocean water, said deep ocean water characterized by cold temperature;

a collection tank;

a supporting structure; and a heat exchanger, further comprising pipes, said pipes further comprising inner and outer surfaces;

wherein cold temperature passes from said inner surfaces to said outer surfaces;

wherein the supporting structure further comprises means for accepting atmospheric vapor in the location of said heat exchanger;

said atmospheric vapor being in contact with said heat exchanger; said contact resulting in condensate on said heat exchanger.

14. The apparatus of claim 13, wherein said collection tank is located below said heat exchanger, wherein said condensate falls from said heat exchanger into said collection tank.

15. The apparatus of claim 13, further comprising a vibrator;

said vibrator located on said supporting structure, wherein the vibrator is in proximity of said heat exchanger where the vibrator can affect a vibration on said heat exchanger.

16. The apparatus of claim 13, further comprising an outlet pipe, wherein said deep ocean water exits said heat exchanger through said outlet pipe.

17. The apparatus for claim 16, wherein said outlet pipe is connected to a second stage; said second stage comprising;

a second siphon, further comprising a second piping system with length great enough to reach cold deep ocean water; said cold deep ocean water being characterized by cold temperature;

a collecting structure, further comprising at least one collecting chamber, comprising at least one second heat exchanger, comprising second pipes, comprising inner and outer surfaces;

a vortex generator, further comprising a tower, comprising a base, a top, a transfer channel, a plenum chamber, and a rotor;

a second supporting structure;

an inlet pipe connected to said outlet pipe; said inlet pipe being in communication with said vortex generator, wherein said deep ocean water is transported by said inlet pipe into said plenum chamber;

wherein said second siphon elevates the cold deep ocean water to said second heat exchanger, wherein cold temperature passes from said inner surfaces to said outer surfaces;

said collecting chamber further comprising means for accepting atmospheric vapor in the location of said second heat exchanger;

wherein said collecting chamber is connected to said tower by said transfer channel;

said vortex generator containing water vapor, wherein said water vapor from the vortex generator is moved by said rotor through said transfer channel;

said atmospheric vapor and water vapor being in contact with said second heat exchanger, said contact resulting in a second condensate on said second heat exchanger.

18. The apparatus of claim 17, wherein said collecting chamber further comprising at least one second collection tank located below said second heat exchanger; wherein said second condensate falls from said second heat exchanger into said second collection tank.

19. The apparatus of claim 17, wherein the second stage is elevated above the first stage.

20. The apparatus of claim 17, further comprising a second vibrator; said second vibrator being located on said second supporting structure, wherein the second vibrator is located in proximity to said second heat exchanger where second vibrator can affect a vibration on said second heat exchanger.

21. The apparatus of claim 17, further comprising a second inlet pipe; wherein the second inlet pipe is connected to a third stage.

22. The apparatus of claim 21, the third stage further comprising:

a stacking tower;

a third siphon; comprising a third piping system, said third piping system in connection with said second inlet pipe, said second inlet pipe connected to said second collecting tank, wherein said second condensate is transported from said second collecting tank to said third piping system;

a third heat exchanger, comprising third pipes, comprising inner and outer surfaces;
a third collecting tank; and
a third supporting structure;
said second condensate being characterized by cold temperature;
said third piping system configured to elevate said second condensate to said third heat exchanger, wherein cold temperature passes from said inner surfaces to said outer surfaces;
said stacking tower comprising means for accepting atmospheric vapor in the location of the third heat exchanger;
said atmospheric vapor being in contact with said third heat exchanger, wherein said contact resulting in a third condensate on said third heat exchanger.

23. The apparatus of claim 22, wherein said third collecting tank is located below said third heat exchanger, wherein said third condensate drips from the third heat exchanger into said third collecting tank.

24. The apparatus of claim 22, wherein the third stage is elevated above the second stage.

25. The apparatus of claim 22, further comprising a third vibrator; said third vibrator located on said third supporting structure, wherein the third vibrator can affect a vibration on said third heat exchanger.

26. A method of producing fresh water comprising;
pumping sea water having a temperature of approximately 10° Centigrade or lower through at least one heat exchanging conduit;
said heat exchanging conduit having an outer surface;
allowing the outer surface of the heat exchanging conduit to interact with atmospheric vapor until water condenses on the outer surface forming condensate;
collecting the condensate that accumulates on the outer surface;
wherein said condensate is pumped into at least one second heat exchanging conduit;
said second heat exchanging conduit having a second outer surface;
allowing said second outer surface of said second heat exchanging conduit to interact with atmospheric vapor until water condenses on the second outer surface forming second condensate;
collecting the second condensate that accumulates on the second outer surface.

* * * * *